(12) United States Patent
Kim et al.

(10) Patent No.: US 7,065,389 B2
(45) Date of Patent: Jun. 20, 2006

(54) LOCKING DEVICE FOR A BATTERY PACK IN A HANDHELD RADIOTELEPHONE

(75) Inventors: Hong-Bae Kim, Yongin-shi (KR); Jong Cheon Wee, Yongin-shi (KR); Jae Shik Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 240 days.

(21) Appl. No.: 10/671,025

(22) Filed: Sep. 25, 2003

(65) Prior Publication Data

US 2004/0063457 A1   Apr. 1, 2004

(51) Int. Cl.
*H04M 1/00* (2006.01)

(52) U.S. Cl. .............. 455/572; 455/90.3; 455/11.1; 455/90.1; 455/550.1; 379/433.08; 320/106; 320/107; 320/112

(58) Field of Classification Search ............. 455/90.3, 455/11.1, 90.1, 572, 550.1; 379/433.08; 320/106, 107, 112
See application file for complete search history.

(56) References Cited

U.S. PATENT DOCUMENTS

| 6,159,632 | A | * | 12/2000 | Osawa ................ 429/100 |
| 6,712,643 | B1 | * | 3/2004 | Suzuki ................ 439/500 |
| 6,730,432 | B1 | * | 5/2004 | Grosfeld et al. ........... 429/97 |
| 6,898,074 | B1 | * | 5/2005 | Hsu et al. .............. 361/679 |
| 2002/0024794 | A1 | * | 2/2002 | Lin et al. .............. 361/686 |
| 2002/0160255 | A1 | * | 10/2002 | Babcock et al. .......... 429/97 |
| 2004/0132319 | A1 | * | 7/2004 | Richter et al. .......... 439/66 |
| 2005/0086982 | A1 | * | 4/2005 | Nakazima et al. ........ 70/214 |

FOREIGN PATENT DOCUMENTS

| KR | 010068980 | * | 7/2001 |
| KR | 10-0315673 | | 11/2001 |

* cited by examiner

*Primary Examiner*—Stephen D'Agosta
*Assistant Examiner*—Chuck Huynh
(74) *Attorney, Agent, or Firm*—Dilworth & Barrese LLP

(57) ABSTRACT

The present invention relates to a handheld radiotelephone having a battery pack attachably and detachably equipped on a rear surface of a main body, and a locking device for allowing the battery pack to be attached or detached. The locking device operates in a perpendicular direction with a length direction of the radiotelephone, and the battery pack is attached or detached while forming an arc around an end of the radiotelephone. The locking device includes an elastic locker having a predetermined elasticity, of which one end is fixed to a predetermined position of a lower casing frame of the radiotelephone and the other end is selectively locked in a locking hole. A pusher installed on the elastic locker, for pushing the elastic locker.

12 Claims, 6 Drawing Sheets

Prior Art

Prior Art

LOCKING DEVICE FOR A BATTERY PACK IN A HANDHELD RADIOTELEPHONE

PRIORITY

This application claims priority to an application entitled "LOCKING DEVICE FOR BATTERY PACK IN PORTABLE RADIOTELEPHONE" filed in the Korean Intellectual Property Office on Sep. 25, 2002 and assigned as Serial No. 2002-0058025, the contents of which are incorporated herein by reference.

BACKGROUND OF THE INVENTION

1. Field of the Invention

The present invention relates generally to a handheld radiotelephone, and more particularly, to a locking device for a battery pack in a handheld radiotelephone, which is configured such that a battery pack disposed on a rear surface of a radiotelephone body is easily detachable and an installation space is minimized, thereby contributing to a miniaturization of the radiotelephone.

2. Description of the Prior Art

As the electronic communication industry develops, a handheld radiotelephone having various functions and shapes is continuously advancing, and shows a tendency to a gradually lighter and simpler external form and to the contrary, a gradually complicated function.

Generally, the above-described handheld radiotelephone has a detachable battery pack mounted on a body as a power supply source. The battery pack is provided with a power supply terminal. When the battery pack is mounted on the body of the radiotelephone, it electrically connects with the power supply terminal of the radiotelephone corresponding to the battery pack to supply a power supply.

A locking device for fixing a position of the battery pack after the battery pack is mounted on the body of the radiotelephone is installed in the radiotelephone, and a user can attach and detach the battery pack to and from the radiotelephone by manipulating the locking device.

Attachment and detachment of the battery pack now in use is exemplified in two methods, one of which uses a guide rib installed on a rear surface of the body for slide mounting, and the other of which uses a latch mechanism for latching the battery pack at one end thereof and then pulling the battery pack downward with respect to the latch mechanism for locking.

The first mounting method is disclosed in Korean Patent Application No.: 2000-1163 filed on Jan. 11, 2000 by the applicant, and is illustrated in FIG. 1. Referring to FIG. 1, a locking device for locking the battery pack 200 uses a push-type locker 105, and when the locker 105 vertically operates in a direction of ①, the radiotelephone 100 slides in a direction of ② while detachment is made.

However, the mounting method of the battery pack 200 using the above-described push-type locker 105 has a drawback in which, because the battery pack 200 is attached and detached using a sliding method in a length direction of the radiotelephone, a guide rib or groove 104 for guiding the battery pack 200 must be formed on the body of the radiotelephone 100 and the battery pack 200, thereby resulting in a space problem that prevents miniaturization of the radiotelephone, and in which when the locker 105 is unintentionally pressed in a handheld state, the battery pack 200 slides from the body of the radiotelephone 100 and separates from the body thereof, thereby causing the power supply to turned-off the radiotelephone irrespective of a user's intention.

The second mounting method is disclosed in Korean Patent Application No.: 2000-19292 filed on Apr. 12, 2000 by the applicant, and is illustrated in FIG. 2. Referring to FIG. 2, the locking device for locking the battery pack uses a slide-type locker 205, and when the locker 205 horizontally operates in a direction of ①, the battery pack 200 is constructed such that attachment and detachment are made in a direction of ②, that is, in a vertical direction. At this time, the battery pack 200 is attached and detached by rotating to and from the radiotelephone 100, centering on a connection part in which at least one lug 201 (or groove) formed at one end of the battery pack is connected to the groove 106 (or lug) formed on the radiotelephone 100.

However, the slide-type locker 205 has a drawback in which, because a user fits a nail to the lug or into a groove of the locker 205 and pulls the locker 205 for manipulation, its manipulation is not only inconvenient, but may also break the user's nail. Further, because a space for allowing the locker 205 to be slid therein must be provided in the radiotelephone 100, such a space prevents miniaturization of the radiotelephone.

SUMMARY OF THE INVENTION

Accordingly, the present invention is directed to a locking device for a battery pack in a handheld radiotelephone that substantially obviates one or more problems caused by the above and other limitations and disadvantages of the related art.

An object of the present invention is to provide a handheld radiotelephone constructed such that a push-type locking device is used and at the same time, a battery pack can be attached and detached vertically.

Another object of the present invention is to provide a locking device for a battery pack, which is configured to minimize the installation space and thus contribute to the miniaturization and lightness of a radiotelephone.

A further object of the present invention is to provide a locking device for a battery pack of a handheld radiotelephone, which is configured to enable a user to handle the locking device with greater ease.

Still another object of the present invention is to provide a locking device for a battery pack of a handheld radiotelephone, which is configured not to use an elastic body and a locker separately, but to use a single element in which the elastic body and the locker are integrated.

To achieve the above and other objects, the present invention provides a handheld radiotelephone comprising: a battery pack attachably and detachably equipped on a rear surface of a main body as power supply means; and a locking device for enabling the battery pack to be attached or detached, wherein the locking device operates in a perpendicular direction with a length direction of the radiotelephone, and the battery pack is attached or detached while forming an arc around an end of the radiotelephone.

Further, the locking device according to the present invention comprises: an elastic locker having a predetermined elasticity, of which one end is fixed to a predetermined position of a lower casing frame of the radiotelephone and the other end is selectively locked in a locking hole formed in a battery pack; and a pusher installed on the elastic locker, for pushing the elastic locker.

Preferably, the elastic locker is constructed of metal (ex. SUS (Steel Use Stainless)). When the elastic locker is pushed by the pusher, the elastic locker is contracted and then restored to the original state. More preferably, the elastic locker is formed in a "Z" shape such that an upper end thereof is selectively locked in a locking hole of the battery pack according to an operation of the pusher.

The pusher is installed to be movable so as to selectively push the elastic locker vertically on the frame of the radiotelephone, i.e., on an upper surface where the elastic locker is installed. Preferably, the pusher may be installed in a snap-fit structure on the radiotelephone such that an up and down movement is possible while preventing a release after the coupling.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Also, when it is determined that the subject of the invention may be made ambiguous by a detailed description thereof, the detailed description will be omitted.

Figure 1:
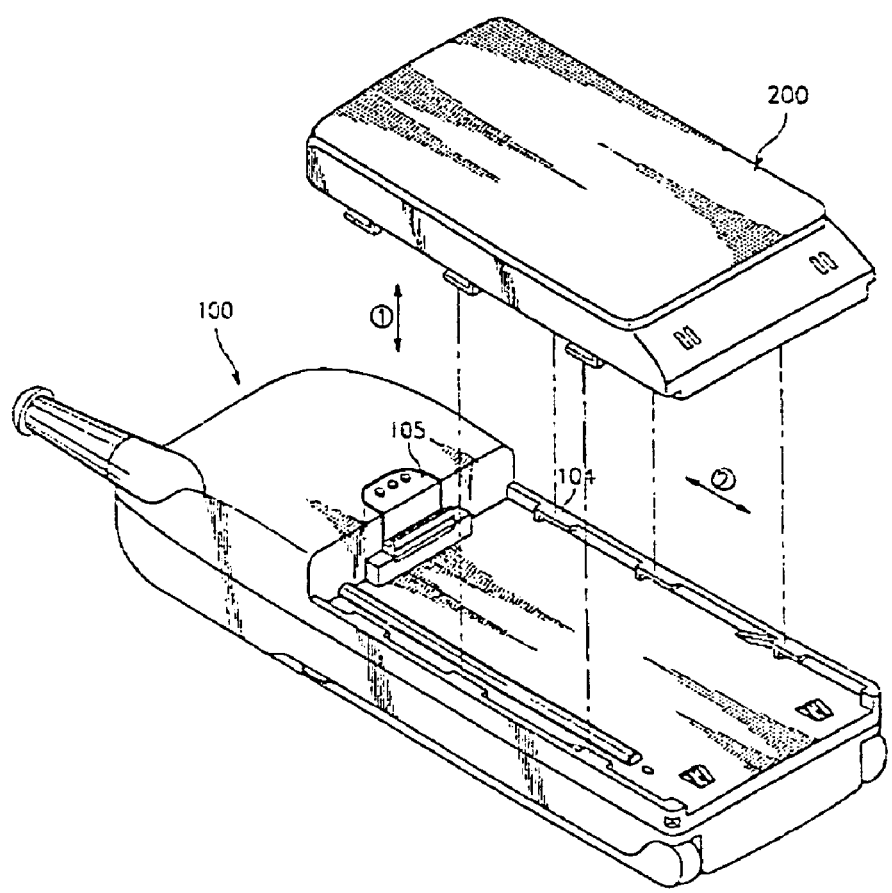
FIG. 1 is a perspective view of a handheld radiotelephone including a push-type locker according to the prior art.
Figure 2:
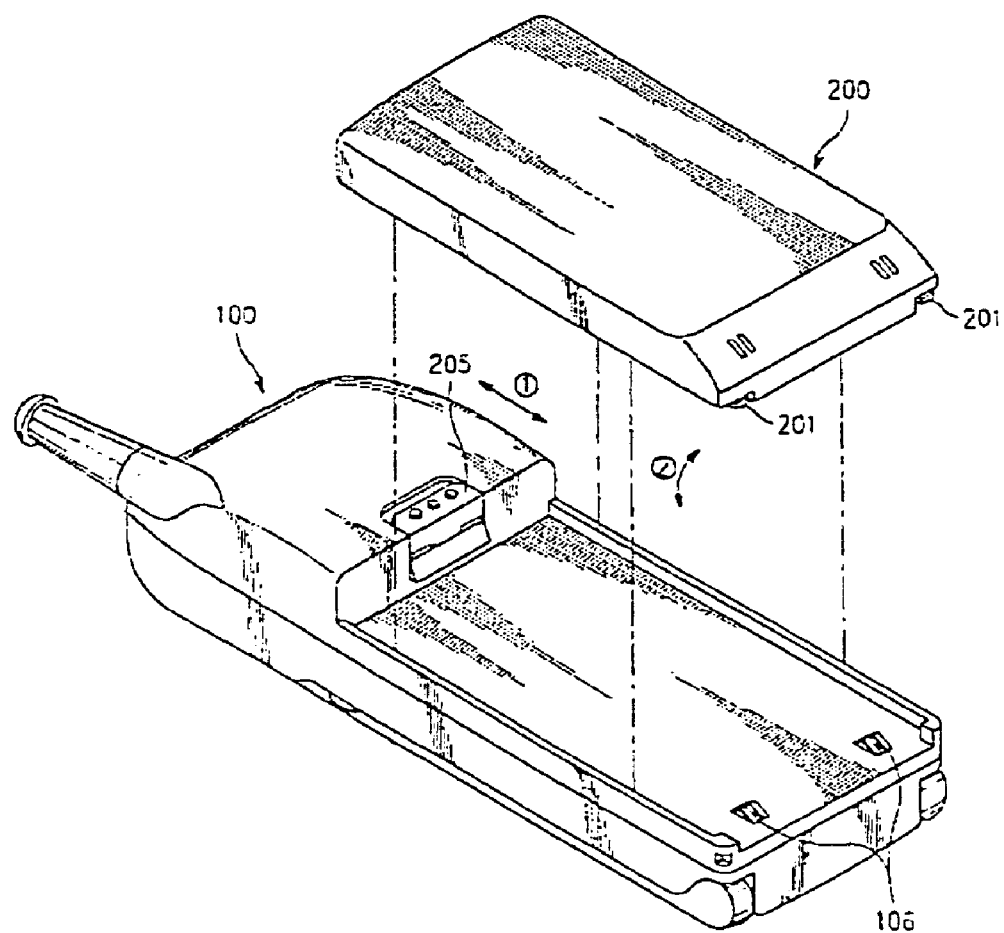
FIG. 2 is a perspective view of a handheld radiotelephone including a slide-type locker according to the prior art.
Figure 3:
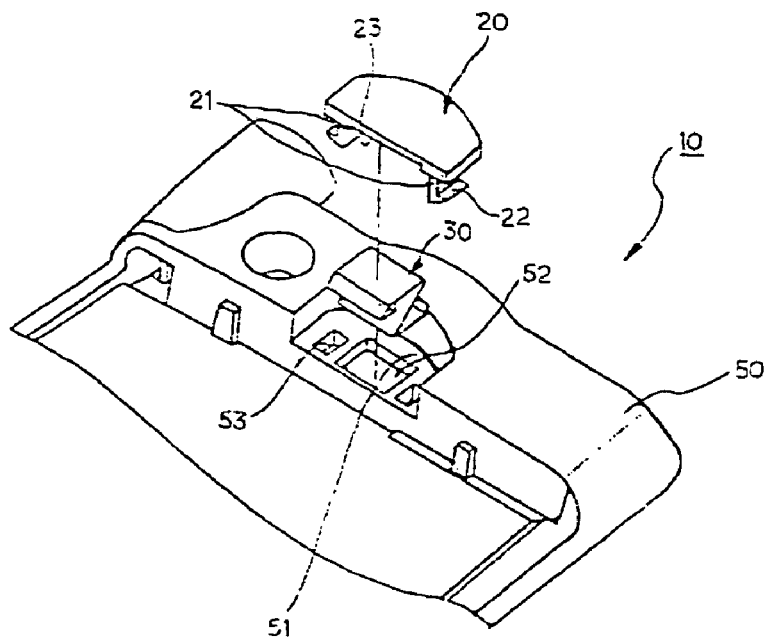
FIG. 3 is a partially exploded perspective view of a handheld radiotelephone including an elastic locker according to the present invention.

FIG. 3 is a partially exploded perspective view of a handheld radiotelephone including an elastic locker according to the present invention. Referring to FIG. 3, a locking device 10 according to the present invention is installed on a locking device installation part 51 formed on a lower casing frame 50 of a radiotelephone. As the locking device 10, an elastic locker 30 and a pusher 20 are sequentially installed.

The pusher 20 has at least two guide ribs 21 with a predetermined length, each having a hook 22 formed at an end thereof. The guide ribs 21 and hooks 22 are coupled in a snap-fits structure to corresponding penetration holes 53 formed around an elastic locker mounting groove 52 formed in the casing frame 50 of the radiotelephone. As a result, the pusher 20 is movable up and down. This construction enables the pusher 20 to vertically push the elastic locker 30 and thus to perform a smooth locking operation. In other words, this embodiment enables the pusher 20 to be pushed upward when the elastic locker 30 is restored in an upward direction.

Also, the guide rail 23, which prevents separation of the elastic locker 30 and guides the movement thereof, is formed on the side of the pusher 20, which faces the elastic locker 30.

Figure 4:
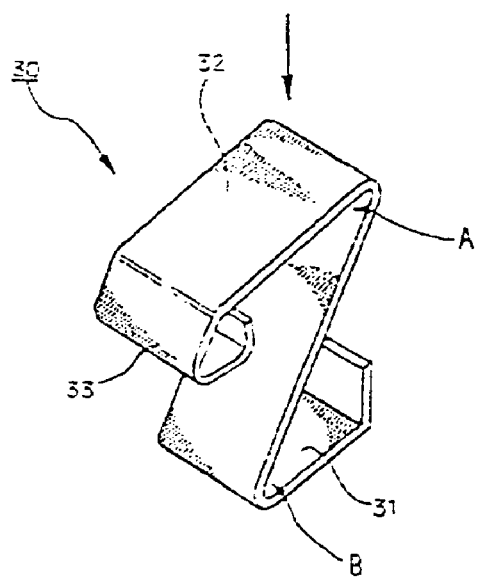
FIG. 4 is a perspective view of an elastic locker according to the present invention.

FIG. 4 is a perspective view of an elastic locker according to a preferred embodiment of the present invention. In FIG. 4, the elastic locker 30 is formed in a "Z" shape. The elastic locker 30 includes a fixed terminal 31 mountedly fixed to the mounting groove 52 formed on the locking device installation part 51 of the lower casing frame 50 of the radiotelephone, and a free terminal 32 pushed or retreated by a predetermined interval to or from the fixed terminal 31 according to a pushing operation of the pusher 20, wherein the fixed terminal 31 and the free terminal 32 are formed in one body. The fixed terminal 31 may be bonded on the mounting groove 52 by a predetermined adhering means. Preferably, the fixed terminal 31 is tightly and forcibly inserted in the mounting groove 52, and is controlled by the pusher 20. When the elastic locker 30 is pushed by the pusher 20 in an arrow direction of FIG. 4, portions "A" and "B" are subject to a predetermined elastic force so that the locker 30 can contract downward as a whole.

Also, an end portion of the free terminal 32 of the elastic locker 30 can be formed as a locking part 33 having a hook shape after the end portion is bent inwardly several times to correspond to the shape of a locking hole 41 (see FIGS. 5 to 7) formed in the battery pack 40.

The elastic locker 30 is of metal, for instance, material capable of being subject to the elasticity, such as SUS, copper (Cu), aluminum (Al) or the like.

Figure 5:
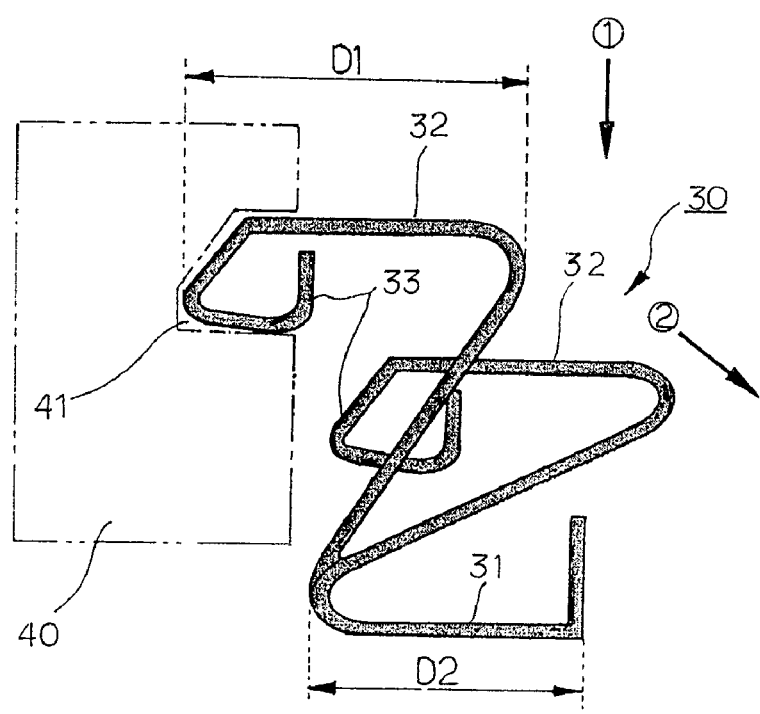
FIG. 5 is a schematic view illustrating an operation of an elastic locker according to the present invention.

FIG. 5 is a schematic view illustrating an operation of an elastic locker according to a preferred embodiment of the present invention. In FIG. 5, the elastic locker 30 is configured such that the length D1 of the free terminal 32 is greater than the length D2 of the fixed terminal. Alternatively, the elastic locker 30 is configured such that the locking part 33 of the free terminal 32 is protruded in a front direction of the fixed terminal. By doing so, when the elastic locker 30 is pushed in direction ① by the pusher 20, the elastic locker 30 performs an operation in direction ②, i.e., a lower direction and a rear direction.

Figure 6:
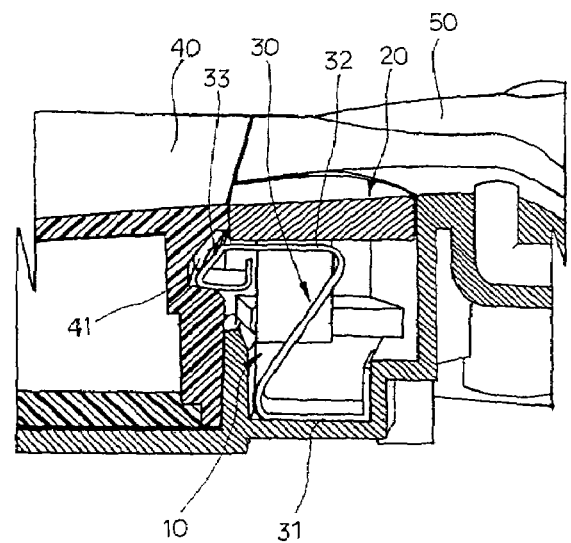
FIG. 6 is a partial sectional view of a battery pack fixed on a radiotelephone according to the present invention.
Figure 7:
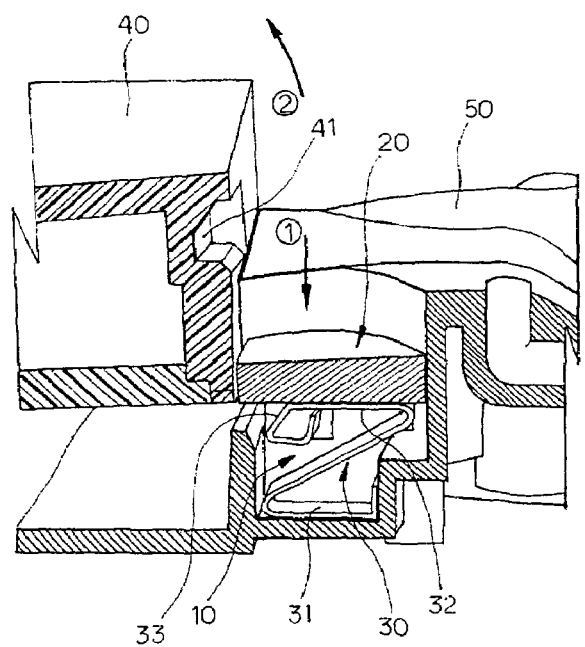
FIG. 7 is a partial sectional view of a battery pack released from a radiotelephone according to the present invention.

FIG. 6 is a partial sectional view of a battery pack when it is fixed on a radiotelephone according to the present invention, and FIG. 7 is a partial sectional view of a battery pack when it is released from a radiotelephone according to the present invention.

More specifically, FIG. 6 illustrates that the locking part 33 formed in the free terminal 32 of the elastic locker 30 is locked in the locking hole 41 of the battery pack 40 and thereby the battery pack 40 is tightly fixed on the lower casing frame 50 of the radiotelephone. Accordingly, the pusher 20 is placed to be consistent with the rear surface (an outer surface of the lower casing frame) of the radiotelephone so as to maintain an original state of the elastic locker 30. In this case, if a user does not handle the pusher 20, it maintains the current state.

FIG. 7 illustrates the pusher 20 pushed in a lower direction (direction of ①) so as to separate the battery pack from the radiotelephone. In this case, the elastic locker 30 pushed by the pusher 20 is pushed in a rear direction while the free terminal 32 descends downwardly to the fixed terminal 31. At this time, the locking part 33 formed in the free terminal 32 of the elastic locker 30 is released from the locking hole 41 of the battery pack 40, so that a user can separate the battery pack 40 from the radiotelephone. Accordingly, the user separates the battery pack 40 from the radiotelephone while pushing the pusher 20.

Figure 8:
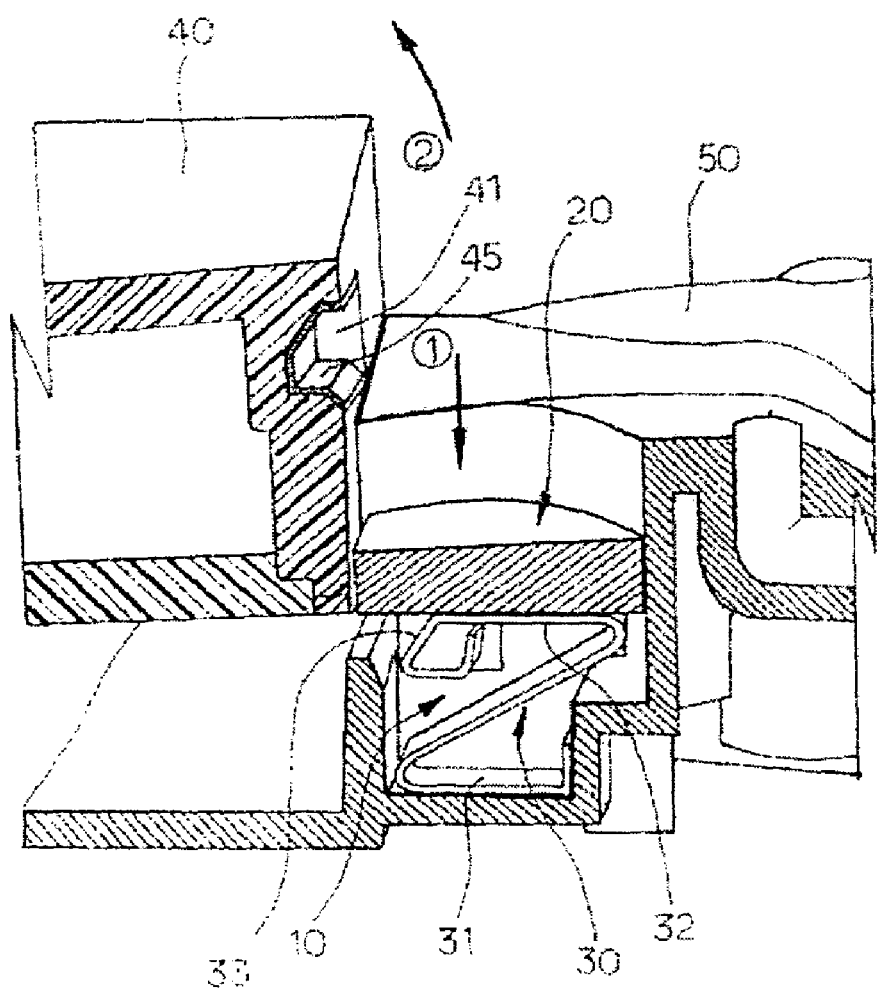
FIG. 8 is a partial sectional view of a battery pack according to an embodiment of the present invention.

FIG. 8 is a partial sectional view of a battery pack according to another embodiment of the present invention. In FIG. 8, a metal cover 45 is formed on the locking hole 41 of the battery pack 40. The metal cover 45 prevents an abrasion that may occur upon contact with the elastic cover 30, thereby enabling a smooth locking operation for a longer period time.

Although the present invention realizes a push-type locking device so as to vertically couple or separate the battery pack from a radiotelephone, the push-type locking device according to the present invention can also be applied to a construction in which the battery pack is coupled to or separated from the radiotelephone in a sliding method.

In addition, although the elastic locker according to the present invention is formed in a "Z" shape, it is apparent to those skilled to the art that the elastic locker can be modified in a variety of shapes in a push-type locking device in which the elastic means and the locker are integrated.

Further, because the locking device according to the present invention operates in a vertical direction, perpendicular to the length direction of the radiotelephone, and the battery pack is configured to be coupled to or separated from the radiotelephone with forming an arc around an end of the radiotelephone, space utilization is maximized. Accordingly, the locking device contributes to the miniaturization of the radiotelephone and a user can smoothly handle the locking device.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A locking device for a handheld radiotelephone that attaches and detaches a battery pack to and from the radiotelephone comprising:
    an elastic locker having a first end fixed on the radiotelephone and a second end selectively locked in a locking hole formed in the battery pack for simultaneously performing an elastic operation and locking operation, wherein the elastic locker formed in a in a "Z" shape, and includes a fixed terminal, which mountedly fixed to a mounting groove of a lower casing frame of the radiotelephone, and a free terminal, which is retreated by a predetermined interval toward at least one of a lower side and a rear side around the fixed terminal according to a pushing operation of the pusher, that are integrally formed; and
    the pusher being installed on the elastic locker, for pushing the elastic locker.

2. The locking device of claim 1, wherein the free terminal of the elastic locker has an end portion formed in a hook shape that is inwardly bent a predetermined number of times to correspond to a shape of the locking hole of the battery pack.

3. The locking device of claim 1, wherein a length of the free terminal is greater than a length of the fixed terminal.

4. The locking device of claim 1, wherein the elastic locker is made of metal.

5. The locking device of claim 2, wherein the elastic locker is made of metal.

6. The locking device of claim 1, wherein the pusher comprises at least two guide ribs of a predetermined length, each of which include a hook formed on an end portion of a lower side thereof, the two guide ribs being coupled in a snap-fit structure to a penetration hole around a mounting groove of the elastic locker formed in a casing frame of the radiotelephone, thereby enabling the pusher to be movable up and down.

7. A handheld radiotelephone comprising:
    a battery pack for power supply means attachably and detachably equipped on a rear surface of a main body;
    a locking device for enabling the battery pack to be attached and detached, the locking device operating in a perpendicular direction with a length direction of the radiotelephone, and the battery pack is attached and detached while forming an arc around an end of the radiotelephone, and wherein the locking device comprises an elastic locker having a predetermined elasticity, of which a first end is fixed to a predetermined position of a lower casing frame of the radiotelephone and a second end is selectively locked in a locking hole, and further wherein the elastic locker is formed in a "Z" and includes a fixed terminal, which is mountedly fixed to a mounting groove of a lower casing frame of the radiotelephone, and a free terminal, which is retreated by a predetermined interval toward at least one of a lower side and a rear side around the fixed terminal according to a pushing operation of the pusher, that are integrally formed; and
    the pusher for pushing the elastic locker.

8. The handheld radiotelephone of claim 7, wherein the free terminal of the elastic locker has an end portion formed in a hook shape that is inwardly bent a predetermined number of times to correspond to a shape of the locking hole of the battery pack.

9. The handheld radiotelephone of claim 7, wherein a length of the free terminal is greater than a length of the fixed terminal.

10. The handheld radiotelephone of claim 7, wherein the elastic locker is made of metal.

11. The handheld radiotelephone of claim 8, wherein the elastic locker is made of metal.

12. The handheld radiotelephone of claim 7, wherein the pusher comprises at least two guide ribs of a predetermined length, each of which having a hook formed on an end portion of a lower side thereof, the at least two guide ribs being coupled in a snap-fit structure to a penetration hole around a mounting groove of the elastic locker formed in the casing frame of the radiotelephone, thereby enabling the pusher to be movable up and down.

* * * * *

UNITED STATES PATENT AND TRADEMARK OFFICE
CERTIFICATE OF CORRECTION

| | |
|---|---|
| PATENT NO. | : 7,065,389 B2 |
| APPLICATION NO. | : 10/671025 |
| DATED | : June 20, 2006 |
| INVENTOR(S) | : Hong-Bae Kim et al. |

It is certified that error appears in the above-identified patent and that said Letters Patent is hereby corrected as shown below:

Title page, item (30) Foreign Application Priority Data: please add

September 25, 2002  (KR) ...... 2002-58025

Signed and Sealed this

Twenty-second Day of May, 2007

JON W. DUDAS
*Director of the United States Patent and Trademark Office*